(12) United States Patent
Shah et al.

(10) Patent No.: US 11,063,662 B2
(45) Date of Patent: Jul. 13, 2021

(54) SATELLITE NETWORK ACCELERATION AND OPTIMIZATION

(71) Applicant: Hughes Network Systems, LLC, Germantown, MD (US)

(72) Inventors: Bhavit Shah, Rockville, MD (US); Satyajit Roy, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/660,403

(22) Filed: Oct. 22, 2019

(65) Prior Publication Data
US 2021/0119696 A1  Apr. 22, 2021

(51) Int. Cl.
| | |
|---|---|
| H04W 88/16 | (2009.01) |
| H04B 7/185 | (2006.01) |
| H04L 12/751 | (2013.01) |
| H04L 12/725 | (2013.01) |
| H04L 12/741 | (2013.01) |

(52) U.S. Cl.
CPC ..... *H04B 7/18584* (2013.01); *H04B 7/18519* (2013.01); *H04L 45/02* (2013.01); *H04L 45/306* (2013.01); *H04L 45/745* (2013.01); *H04W 88/16* (2013.01)

(58) Field of Classification Search
CPC ............ H04B 7/18584; H04B 7/18519; H04L 45/306; H04L 45/02; H04L 45/745; H04W 88/16
See application file for complete search history.

(56) References Cited

U.S. PATENT DOCUMENTS

| | | | | |
|---|---|---|---|---|
| 2016/0094467 | A1* | 3/2016 | Hong | H04L 63/0281 370/235 |
| 2016/0134531 | A1* | 5/2016 | Assarpour | H04L 49/309 370/392 |
| 2017/0005920 | A1 | 1/2017 | Previdi et al. | |
| 2017/0237656 | A1* | 8/2017 | Gage | H04L 61/2521 370/392 |
| 2017/0250902 | A1* | 8/2017 | Rasanen | H04L 47/20 |
| 2019/0288940 | A1* | 9/2019 | Filsfils | H04L 45/52 |

FOREIGN PATENT DOCUMENTS

EP  3300319 A1  3/2018

OTHER PUBLICATIONS

Halpern, J. and Pignataro, C. "Service Function Chaining (SFC) Architecture", RFC 7665, DOI 10.17487/RFC7665, Oct. 2015 [retrieved on Oct. 22, 2019]. Retrieved from the Internet <https://www.rfc-editor.org/info/rfc7665>.
International Search Report and Written Opinion for PCT/US2020/051716 dated Feb. 18, 2021 (11 pages).

\* cited by examiner

*Primary Examiner* — Dong-Chang Shiue
(74) *Attorney, Agent, or Firm* — Bejin Bieneman PLC (57) ABSTRACT

A system comprises a gateway computer further comprising a processor and a memory. The memory stores instructions executable by the processor to determine one or more service functions (SF) based on a received data packet, and to determine a list of routing identifiers based on the determined service functions and a destination of the data packet. Each routing identifier identifies at least one of a router computer and a service function. The memory stores instructions to update the data packet to include the list of routing identifiers, and to transmit the updated data packet based on the list of routing identifiers.

17 Claims, 5 Drawing Sheets

SATELLITE NETWORK ACCELERATION AND OPTIMIZATION

BACKGROUND

In a communication network, delivery of end-to-end communication services often requires data packets to be processed by so-called "Service Functions" based on an identified data protocol, data packet content, etc. Such Service Functions may include providing or applying a firewall, data compression, etc. Applying Service Functions to data packets which can be different based on protocol, content, etc., may cause latency, scarcity of bandwidth, data packet loss, etc.

DETAILED DESCRIPTION

Introduction

Disclosed herein is a system comprising a gateway computer further comprising a processor and a memory. The memory stores instructions executable by the processor to determine one or more service functions (SF) based on a received data packet, to determine a list of routing identifiers based on the determined service functions and a destination of the data packet, wherein each routing identifier identifies at least one of a router computer and a service function, to update the data packet to include the list of routing identifiers, and to transmit the updated data packet based on the list of routing identifiers.

The data packet may include a payload and header, and the list of routing identifiers is stored in a segment routing header.

The instructions may further include instructions to receive network nodes data, for a plurality of nodes, including available service functions at each of the nodes, and to determine the list of segment identifiers based on the received network nodes data.

The system may further include a network node including a second processor programmed to receive the updated data packet from the gateway computer, and to identify a service function of the node based on node configuration data including an interface identifier of a service function available at the network node.

The second processor of the network node may be further programmed to update the data packet for routing the data packet to a next node based on the list of segment identifiers.

The second processor of a network node may be further programmed to operate a plurality of virtual machines, wherein one or more service functions are provided on each virtual machine.

The data packet may be an internet protocol (IP) data packet and the list of segment identifiers may be stored in routing header data of the IP data packet.

The data packet may include a payload and a network service header, and the list of routing identifiers may be stored in the network service header.

The instructions may further include instructions to receive network nodes data, for a plurality of nodes, including available service functions at each of the nodes, and to determine a list of service path identifiers based on the received network nodes data.

The second processor of the network node may be further programmed to update the data packet for routing the data packet to a next node based on the list of service path identifiers.

The instructions may further include instruction to convert the received data packet to an internet protocol (IP) data packet and to store the list of service path identifiers in routing header data of the IP data packet.

The service function may be a satellite specific service function including network layer protocol spoofing, web acceleration, header compression and suppression.

The service function can be local.

Further disclosed herein is a method comprising determining one or more service functions (SF) based on a received data packet, determining a list of routing identifiers based on the determined service functions and a destination of the data packet, wherein each routing identifier identifies at least one of a router computer and a service function, updating the data packet to include the list of routing identifiers, and transmitting the updated data packet based on the list of routing identifiers.

The method may further include receiving network nodes data, for a plurality of nodes, including available service functions at each of the nodes, and determining a list of segment identifiers based on the received network nodes data.

The method may further include receiving, in a network node, the updated data packet from the gateway computer, and identifying, in the network node, a service function of the node based on node configuration data including an interface identifier of a service function available at the network node.

The method may further include updating, in the network node, the data packet for routing the data packet to a next node based on the list of segment identifiers.

The data packet may include a payload and a network service header, and the list of routing identifiers may be stored in the network service header.

The method may further include receiving network nodes data, for a plurality of nodes, including available service functions at each of the nodes, and determining a list of service path identifiers based on the received network nodes data.

The service function may be a satellite specific service function including network layer protocol spoofing, web acceleration, header compression and suppression.

Exemplary System Elements

Delivery of end-to-end services in a satellite communication network typically requires data packets to be treated in specific functions based on user, flow, protocol, content etc. A satellite gateway (IPGW) typically achieves these functions by using User Space applications (like a network layer protocol spoofing such as TCP-spoofing) & Kernel Space components (like IP Routing Stack for routing). These functions need memory and buffer allocation as well as event and parameter management. A result is that IPGW may not be able to support some terminals based on limitations of memory and computational resources. The resources used to provide these functions typically need to be planned, maintained, and managed. Thus, the resources may not be scalable as a deployment of the satellite system may not be flexible to handle unplanned changes to the usage of network resources.

As disclosed herein, functions such as firewall, TCP-spoofing, etc., can be deployed as Service Functions using Network Function Virtualization (NFV), which can mitigate the above-mentioned limitations often suffered by the acceleration and optimization functions in today's static and non-flexible way of deployment. Moreover, in a satellite network, various services such as consumer broadband enterprise, cellular backhaul, Wi-Fi community hotspot, distance learning, news gathering etc., may have different requirements and characteristics. Thus, not all data packets may need to go through each and every available acceleration and optimization service function. For example, if a data packet is not a TCP-based packet, then TCP spoofing is not required. As another example, HTTPS sessions cannot get benefited from the web page prefetching function. TCP spoofing may not be required for some End to End Layer 2 carrier grade Ethernet services. Therefore, there is no reason to apply an acceleration and optimization function to each data packet in a satellite communication network. An example system is disclosed herein for selectively applying a function to a data packet, as needed.

Figure 1:
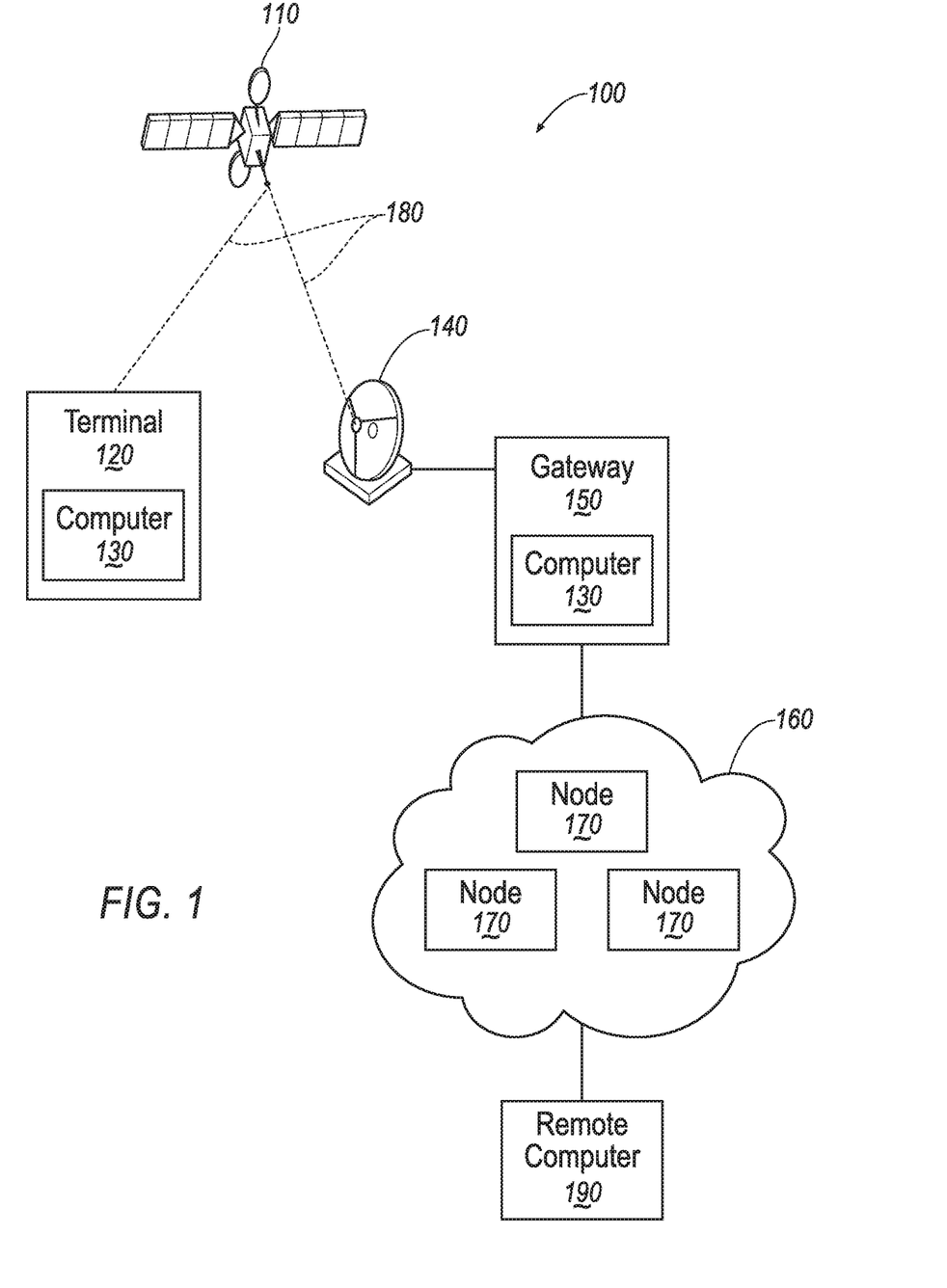
FIG. 1 illustrates an example satellite communication network.

As illustrated in FIG. 1, a satellite network 100 includes satellite(s) 110, at least one terminal 120 including a computer 130, one or more antennas 140, and gateway(s) 150, each of which typically includes one or more computer 130, and a communication network 160 including plurality of interconnected nodes 170 (or network nodes), each of which typically includes one or more computer 130.

The satellites 110 collectively form a constellation (i.e., a group). A position of each satellite 110 in a constellation may change relative to other satellites 110, to the ground, or both. A satellite 110 as is known includes various circuits, chips, or other electronic components. Satellite 110 may be in low Earth orbit (LEO) in multiple planes and orbits relative to one another.

In the present context, a satellite link 180 is a wireless communication path between an (i) antenna of a terminal 120 or a satellite gateway 150, and (ii) a satellite 110 antenna. A satellite link 180 is typically established upon configuring a terminal 120 modulator, demodulator, encoder, and/or decoder of a terminal 120 to communicate with a satellite 110. In the present context, a satellite link 180 may include an uplink, i.e., communication from the terminal 120 to a satellite 105, and/or a downlink 180, i.e., communication from the satellite 105 to the terminal 120. A link 180 may be a downlink 180 from a satellite 110 to a gateway 150 or a terminal 120 or an uplink 180 from a terminal 120 or a gateway 150 to a satellite 110.

A terminal 120, e.g., very small aperture terminals (VSAT), is a computer-based communication device implemented via circuits, chips, antennas, or other electronic components that can communicate with satellites that are within communication range of the terminal. In some instances, the terminals 120 are stationary relative to a location on Earth. In other instances, the terminals 120 are mobile, meaning that the terminals 120 move relative to a location on the Earth. In some instances, the terminal 120 may provide an interface between a satellite 110 and other ground-based communication devices, e.g., coupled to the terminal 120 via a local wired or wireless communication network. In another example, a terminal 120 may receive communications from a satellite 110 and transmit such communications via terrestrial-based communication channels.

A gateway 150 is a device including a computer 110 that is programmed to receive data packets from a satellite 110 via a downlink 180 and forward the received data packets to a network 160 and/or receive data packets from the network 160 and forward them to a satellite 110 via an uplink 180. A data packet herein has the conventional meaning of a unit of data made into a single package for transmission via a medium within a network. For example, data packets are used in Internet Protocol (IP) transmissions for data via the Internet, and/or in other networks. A data packet typically includes raw data—often referred to as the payload, and also headers that include certain types of metadata, along with routing information. For example, IP data packets have a header containing an IP address of origin and a destination identifier, e.g., an IP address of a destination computer. A gateway 150 may be connected to the modulator, e.g., via a Peripheral Component Interconnect (PCI) bus, an IP (Internet Protocol)-network, etc. As discussed below, a gateway 150 computer 110 may be programmed to provide one or more Service Functions (SF), e.g., firewall function, which perform specified operations on the data packets which are received and/or transmitted by the gateway 150.

The communication network 160 is a wired or wireless communication network including a plurality of nodes 170. A node (or network node) includes a computer that communicates with other nodes in the network 160. For example, a node may be a router computer in a computer network. The data packets transmitted by a gateway 150 are communicated via the nodes 170 to a destination computer 190, e.g., a cloud server, a user device, a vehicle computer, etc. A node 170 computer may be programmed to operate a plurality of virtual machines (VR). A virtual machine provides dynamically allocateable computational resources in a node 170 computing device to perform operations on data packets which are transmitted via the node 170 computing device. A node 170 may be identified by an identifier, e.g., a numerical address such as an IP (Internet Protocol) address, MAC (Media Access Control) address, etc. One or more Service Functions SF may be operated on a virtual machine operated on a node 170 computer.

As data packets are transmitted through a gateway 150 and communication network 160, the data packets are typically processed according to one or more rules and/or algorithms selected based on attributes such as a communication protocol for which a packet is formatted, packet content, etc. These functions are typically referred to as Service Functions (SF). One or more Service Functions may be provided by a network node 170 and/or a satellite gateway 150. A node 170 computer may initiate (or call) a Service Function available at the node. A Service Function SF may be identified by an identifier.

Service Functions include traditional network services such as firewalls, Network Address Translation (NAT), Deep Packet Inspection (DPI), TCP spoofing, Header Payload Compression, Domain Name Server (DNS) proxy, Header Suppression, Web Acceleration Services, etc., as well as application-specific functions. Certain Service Functions are described in more detail in the following paragraphs.

TCP Spoofing (or PEP—Performance Enhancing Proxy) is a standardized process to mitigate high bandwidth delay product over a GEO satellite link that prevents a TCP session to reach the highest possible throughput plus to reduce too many ACKs (Acknowledges) of a TCP session on a satellite in-route channel. Bandwidth Delay product is a standard measurement of an amount of data a link 180 can transmit taking into account a round trip delay time.

Header Compression is a process used for header compression to reduce redundant header information. Data packet headers, e.g. IP (Internet Protocol) data packet headers, typically have repetitive information in each packet, which is not required in all packets. Payload compression is a process to compress the payload of a data packet. For example, the V.44 compression technique is used with accelerated TCP connection applications carrying compressible data (e.g., email). V.44 is used to compress HTTP headers. HTTP (Hyper Text Transfer Protocol) Web page acceleration includes, e.g., zlib compression algorithms with HTTP headers and HTTP Web page objects compressed separately.

Web Acceleration Services for HTTP Traffic provides HTTP Web page acceleration that optimizes user-perceived response time for static page content and/or dynamic (e.g., JavaScript) content. Web acceleration typically pre-fetches Web page objects, stores them within the remote terminal memory, delivers those objects to a user Web browser when the browser asks for them.

DNS Proxy provides DNS resolution by caching a DNS response within a remote terminal to eliminate round trip satellite hops for DNS lookups. Caching, e.g., so-called squid caching, includes caching Web content and video content at an edge of the network 160 (e.g., a nearest node 170) such that the request is served locally without a need to go over a satellite interface.

Service Functions may be deployed on dedicated hardware through which the data packets flow, a deployment technique sometimes referred to as "bump-in-a-wire." Deploying a Service Function in dedicated hardware can limit availability, flexibility, scaling, capacity and/or utilization. It may also require a specialized skill set to configure and maintain the proprietary hardware. Network Function Virtualization (NFV) addresses these aforementioned shortcomings by using virtualization technology for network services and features on standard hardware, thus eliminating the need for proprietary hardware. NFV may be applicable to a variety of data packet processing and control plane function in a network 160. Software implementations of network functions that are deployed on NFV infrastructure are called Virtualized Network Functions (VNF). In a network that utilizes Network Function Virtualization NFV, a Service Function SF may be added, removed, and/or modified based on, e.g., user demand, traffic rate, etc. Service Function Chaining (SFC), explained further below, uses Software Defined Networking (SDN) capabilities to create a service chain of connected network services. An SDN control plane node can also define SFPs if needed and is usually called an SDN Controller.

In one example, a computer, e.g., a gateway 150 computer 130 of a satellite network 100, can be programmed to determine one or more Service Functions SF based on a received data packet, determine a list of routing identifiers based on the determined Service Functions SF and a destination of the data packet. Each routing identifier identifies at least one of a router computer, e.g., a node 170 computer, and a Service Function, to update the data packet to include the list of routing identifiers and to transmit the updated data packet based on the list of routing identifiers.

The definition and instantiation of an ordered set of Service Functions SF and subsequent "steering" of traffic through these Service Functions is referred to as Service Function Chaining (SFC). SFC may also use a Service Function Forwarder (SFF), which is responsible for forwarding/receiving traffic to/from one or more Service Functions. A Service Function Forwarder SFF may be a node 170 computer that forwards received data packets based on their destination and routing information stored in the data packets. A path through a network 160 that a packet takes to certain service functions is called Service Function Path (SFP). A path, in the present context, is a result of a sequence of computational steps performed in a plurality of computers communicatively coupled to one another to provide transmission of one or more data packets from one computer to another computer in the network 160, typically at different geographical locations (e.g., different cities, states, provinces, countries, etc.).

As discussed above, a plurality of Service Functions SF can be implemented in a network 100. A computer, e.g., the satellite gateway 150, upon receiving a data packet, may determine one or more Service Functions SF to be applied to the data packet based on one or more parameters such as data protocol, data content, destination of the data packet, network bandwidth, etc. In one example, the satellite gateway 150 computer 130 may identify a TCP spoofing, Web Acceleration, etc., Service Function SF to be applied to a data packet. In one another example, the satellite gateway 150 computer 130 may identify a compression Service Function SF upon determining that a rate of duplicate data in the transmitted data packets exceeds a threshold, e.g., 100 Megabit per second (Mbit/Sec). A Compression Service Function includes reducing data bytes by finding duplicate or redundant information between data packets. Not all packets may be eligible for compression, e.g., packets including encrypted information, already compressed information, etc. The computer 130 may be programmed to include a Compression Service Function in the Service Function Chaining upon determining that the transmitted data is eligible for data compression, e.g., not encrypted and a date of duplicate data exceeding a threshold. Additionally, the computer 130 may be programmed to convert a data packet protocol from a non-IP protocol, e.g., Ethernet, to an IP protocol data packet.

There are various techniques to achieve Service Function Chaining. For example, a header of a data packet may be modified using a Service Function Chaining encapsulation technique such as a routing header (a routing extension header or routing label) like Segment Routing (FIG. 2), a Network Service Header (FIG. 3), or a combination of any such techniques.

Figure 2:
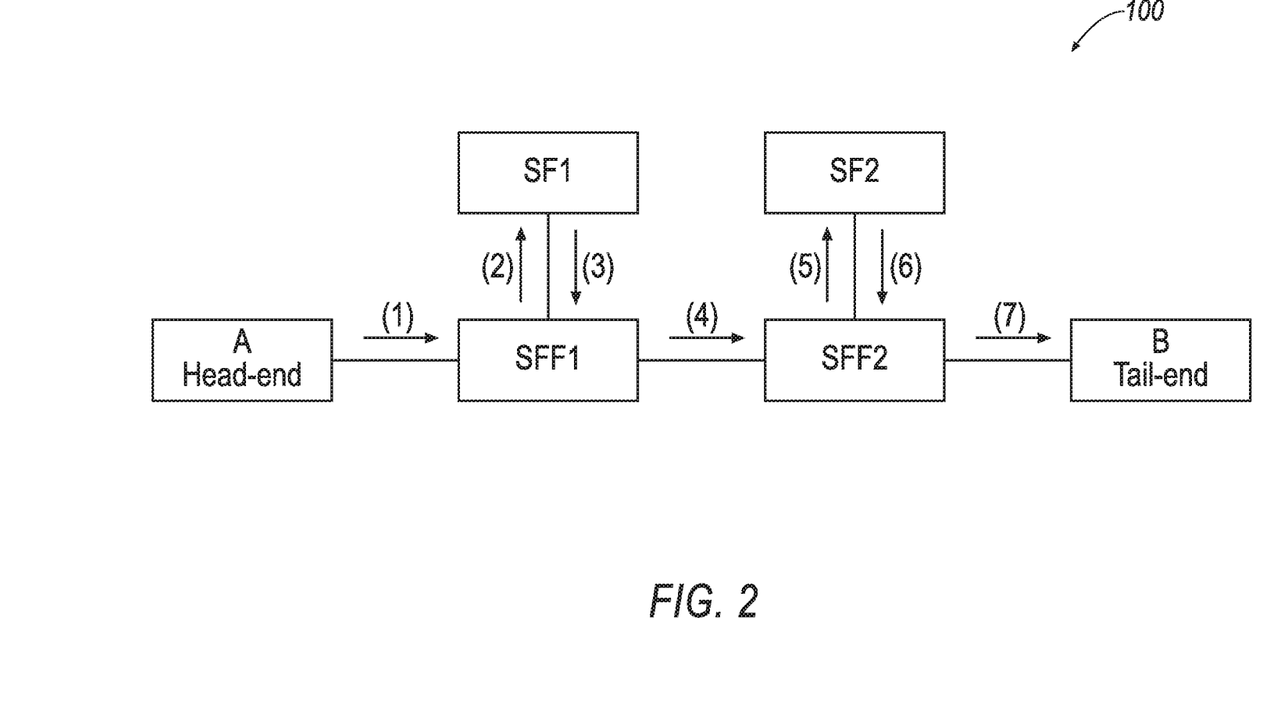
FIG. 2 illustrates Service Function Chaining (SFC) in a Segment Routing domain.

FIG. 2 illustrates an example diagram for Service Function Chaining (SFC) in an example Segment Routing domain, e.g., the satellite network 100 including the network 160. In the example shown in FIG. 2, a data packet enters a network 100 via an ingress point or head-end A, e.g., the satellite gateway 150, and exits the Segment Routing network via an egress point or tail-end B, e.g., a node 170 communicating with a remote computer 190 such as an internet-based cloud server (FIG. 1).

Segment Routing (SR) is a routing technique. A node 170 steers data packet(s) through an ordered list of "segments" or "segment identifiers" SID. A segment or segment identifier identifies either (i) a pair of start and target nodes 170 identifiers to transmit a data packet from the start node 170 to the target node 170, or (ii) a node 170 identifier and a Service Function identifier for applying a Service Function available at the respective node 170 to the data packet. A segment or segment identifier includes a start identifier and a target identifier and specifies an instruction to perform one or more Service Functions (SF) and/or an instruction to forward a data packet. Each of start or target identifier may be an identifier of a Service Function Forwarder SFF such as a node 170, a satellite gateway 150 computer 130, and/or a Service Function SF identifier. Labels (1) through (7) illustrate a path of the data packet through the network 160. Segment Identifiers SID may be used to implement Service Function Chaining SFC. In one example, when the data packet is an internet protocol (IP) data packet, a list of segment identifiers is then stored in routing header data of the IP data packet.

SR-MPLS (Segment Routing-Multiprotocol Label Switching) and SRv6 (Segment Routing over IPv6 data plane) are two example implementations of Segment Routing. In the case of SRv6, a Segment Routing Header (SRH) within IPv6 Header is used to encode the segment identifiers SID. Routing of data packets may be implemented using a Segment Routing Header SRH. Thus, the data packet includes a payload and header, and the list of routing identifiers is stored in the Segment Routing Header SRH which is included in the header of the data packet besides other header data.

The data packets from a head-end A to tail-end B pass through Service Functions SF1 and SF2. Service Functions SF1 and SF2 may be TCP spoofing, NAT, DPI, etc., as discussed above. Service Function Forwarders SFF1 and SFF2 are nodes 170 that can forward and/or receive SRv6 data packets. The Service Function Forwarders SFF1 and SFF2 may be nodes 170 of the network 160 (FIG. 1). The Service Function Forwarders SFF1 and SFF2 may have a local Segment Identifier SID table in which the SIDs SFF1→SF1 and SFF2→SF2 are defined as forward to the Service Functions SF1 and SF2 respectively. An operation a→b means sending a data packet from a to b. Each of a and b can be a Service Function SF identifier or a Service Function Forwarder SFF identifier. Each of a or b may be a physical node 170 or virtual entity, e.g., a Service Function executed by the node 170 computer. An operator→is an example separator symbol separating a start and target of a segment. In one example, in a segment SFF1→SF1, a is an identifier of a physical hardware, e.g., a node 170 computer programmed to operate as the Service Function Forwarder SFF1, and b is the Service Function SF1 which may be operated on a virtual machine of a second node 170 or programmed on a virtual machine operated on the Service Function Forwarder SFF1. In another example, in a segment SFF1→SFF2, a may be a first physical node 170 and b may be a second physical node 170. In yet another example, in a segment SF1→SFF1, a is the Service Function SF1 and b is the Service Function Forwarder SFF1. In other words, a or b may be: (i) an identifier of a physical hardware, e.g., a node 170 computer, operating a Service Function Forwarder, (ii) an identifier of a Service Function that is implemented on a proprietary hardware, e.g., an identifier of a hardware component with firewall Service Function, or (iii) a virtual entity such as a Service Function executed on a virtual machine on a hardware entity such as a node 170.

The head-end A, e.g., the satellite gateway 150 computer 130, may identify Service Functions SF1 and SF2 based on the received data packet and may determine the segment identifiers for the data packet based on the identified Service Functions SF1 and SF2. Thus, the data packet may be encapsulated in a new IPv6 header with the Segment Identifier SIDs in Segment Routing Header SRH as A→SFF1, SFF1→SF1, SF1→SFF1, SFF1→SFF2, SFF2→SF2, SF2→SFF2, SFF2→B. The head-end A, e.g., the satellite gateway 150 computer 130, may forward the data packet to the Service Function Forwarder SFF1. The data packet may be encapsulated in a new IPv6 header with SIDs in the Service Routing Header SRH as [SFF1::SF1, SFF2::SF2, B::]. An instruction a::b in IPv6 protocol means sending a data packet to b via a, where b can be Service Function SF identifier and a can be a Service Function Forwarder SFF identifier. Thus, an instruction like B::means sending the data packet via node B without applying any Service Function.

Based on the SFF1→SF1 entry in the Service Identifier SID of the data packet received from the head-end A, Service Function Forwarder SFF1, e.g., a node 170, may forward the data packet to a Virtual Machine VM operated on a computer of the Service Function Forwarder SFF1 for performing the Service Function SF1.

A network node 170 computer, e.g., a Service Function Forwarder SFF1, may update the data packet for routing the data packet to a next node, e.g., a Service Function Forwarder SFF2 based on the list of segment identifiers. For example, the Service Function Forwarder SFF1 can update the Segment Identifier SID list of the data packet to SFF2: SF2, and then transmit the data packet using a routing technique, i.e., a process such as is known of selecting a path for traffic in a network 160 or between or across multiple networks 160. In this way, the data packet goes through a Service Function SF2 before it reaches the tail-end B. Note that the Service Functions SF1, SF2 are applied to the payload of the data packet without altering the outer encapsulated IPv6 header and hence do not alter the Service Function Chaining SFC path.

As discussed above, a head-end A computer, e.g., a node 160 computer or a gateway 150 computer 130, may determine a list of segments, e.g., [SFF1::SF1, SFF2::SF2, B::] as discussed above. Thus, the head-end A computer may need information about a location in the network 160 the respective Service Functions SF are available. A network in this context is defined by edges between first and second nodes 170 by which other nodes can establish a path from the first node 170 to the second node 170. In one example, the head-end A computer may receive network 160 node 170 data, for each of a plurality of nodes 170, including available Service Functions SF at each of the nodes 170, and may determine the list of segment identifiers based on the received network nodes data. In the present context, network 160 node 170 data includes identifier of nodes 170, e.g., IP address of each node 170, identifier of Service Function(s) available at each node 170. In the present context, a node 170 may include the satellite gateway 150, i.e., the satellite gateway 150 is also a node 170.

Table 1 shows an example set of network 160 node 170 data. The node 170 identifiers Id1, Id2, Id3 may be IP address or may be based on any other type of addressing scheme. Based on Table 1, Service Functions SF1, SF5 may be available at a node 170 with identifier Id1. Thus, the Service Functions SF1, SF5 may be available on a virtual machine operated on the respective node 170. Additionally, the network node data may include other data such as geographical location (e.g., region, city, location coordinates, etc.) of the node 170. Additionally, the network node data may include information specifying connections of nodes 170 to one another. For example, Table 1 may include an additional column specifying identifiers of other nodes 170 directly accessible from the respective node 170.

TABLE 1

| Node identifier | Service Function(s) |
|---|---|
| Id1 | SF1, SF5 |
| Id2 | SF2, SF3, SF5 |
| Id3 | SF4, SF6 |

In an example with reference to Table 1, the head-end A computer may determine, based on the data packet content, protocol, etc., that the Service Functions SF3, SF4 are to be applied to the data packet, and to determine the routing identifier including nodes 170 with identifiers Id2, Id3 and Service Functions S3, S4 available at the respective nodes 170.

A node 170 computer may be programmed to receive the data packet including a list of routing identifiers, e.g., a Segment Identifier SID list, from another node 170, e.g., the satellite gateway 150 computer 130, and to identify a Service Function SF1 based on node 170 configuration data including an interface identifier of a Service Function SF1 available at the network node 170. In the present context, node configuration data includes a list of locally available (local in this context means at a same node 170) Service Functions SF and information associated with initiating each local Service Function SF, e.g., interface identifier of each Service Function SF, a virtual machine identifier on which a Service Function is executed, etc.

As discussed above with reference to FIG. 2, a node 170 such as a Service Function Forwarder SFF1 may receive the data packet and forward the data packet to the Service Function SF1 and upon performing the Service Function SF1, may forward the data packet to a next node 170 such as the Service Function Forwarder SFF2. In one example, a node 170 updates the header data of data packet prior to navigating the received data packet to, e.g., the next node 170.

Figure 3:
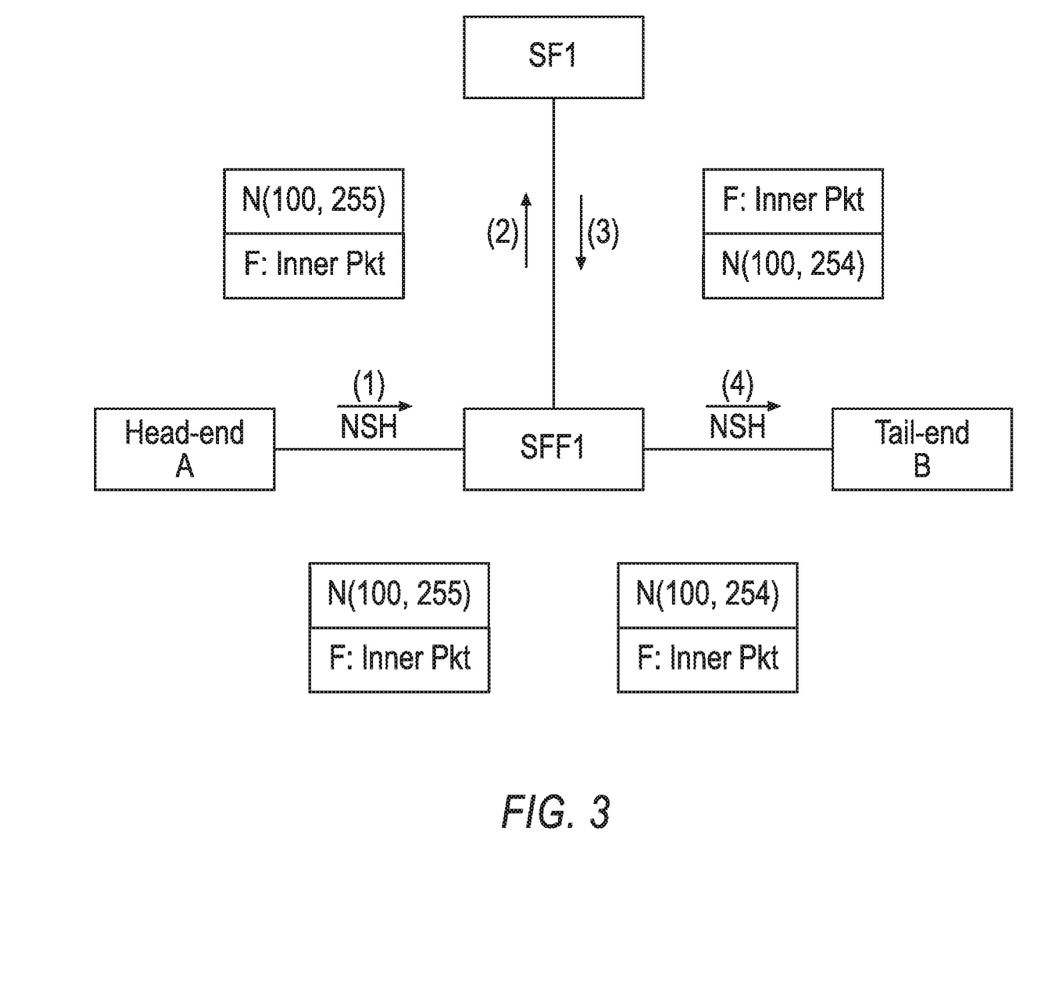
FIG. 3 illustrates Service Function Chaining (SFC) using Network Service Header (NSH).

Alternatively, as mentioned above, Network Service Header NSH may be used to achieve Service Function Chaining SFC. FIG. 3 illustrates a communication network 160 implementing Network Service Header NSH to perform Service Functions SF on data packets navigated through the network 160.

Network Service Header (NSH) is a protocol that provides a mechanism to encapsulate a data packet with SFP information necessary to perform SFC. Amongst other elements, NSH typically includes Service Path Header having a Service Path Identifier (SPI). Service Path Identifier (SPI) includes path identification information that uniquely identifies an SFP and is stored inside the Service Path Header. An NSH imposed packet/frame can further be encapsulated by any transport protocol for network forwarding. Thus, NSH can be used to implement SFC.

For example, a head-end A such as a satellite gateway 150 computer 130 and/or any other computing device may determine a service path for an incoming data packet. For example, Service Function SF1 may be TCP, DPI, etc. A Service Function Forwarder SFF1 may be a computer programmed to interpret a Network Service Header NSH and to serve as a forwarder to the Service Function SF1. The head-end A which determines the path for the data packet, thus determines that the data packet is sent to the Service Function SF1. The head-end A thus further encapsulates the data packet in a first data packet <Inner Pkt><NSH: SPI 100, SI 255><Outer transport> (i.e., Service Function (SF) identifier(s) is stored in the network service header.) The Service Function Forwarder SFF1 is a first Service Function stop in the Service Function Chain. The encapsulated data packet is forwarded to the Service Function Forwarder SFF1. Data packet transport data, e.g., <NSH: SPI 100, SI 255><Outer transport>, is added to encapsulate the original data packet <Inner Pkt>. Transport layer data can be MPLS (Multi-Protocol Label Switching), VLAN (Virtual Local Area Network), etc.

Upon receiving a data packet, a network node 170 computer may be programmed to update the data packet for routing the data packet to a next node 170 based on the list of service path identifiers. The Service Function Forwarder SFF1 generates a second data packet by removing the outer transport (e.g., SR-MPLS, SRv6) of the first data packet and forwards the second data packet toward the Service Function SF1. The Service Function SF1 is applied and then a third data packet including the result of processing the data packet by the Service Function SF1 is sent back to the Service Function Forwarder SFF1. Similarly, the Service Function SF2 is performed on the data and a data packet including results of applying the Service Functions SF1, SF2 is then forwarded to the tail-end B. Thus, Network Service Header NSH can be used to implement Service Function Chaining SFC.

The head-end A computer may be programmed to receive network nodes data, for a plurality of nodes 170, as discussed above, and to determine the list of service path identifiers based on the received network nodes data. In the case of Segment Routing, upon a determination based on the received packet, the headend A computer can attach a list of segment identifiers SR in Segment Routing Header, and can forward the encapsulated data packet to a first segment. Subsequently, each node 170 computer specified in the segment list forwards the data packet to a next node 170 specified in the segment list, and thus the packet traverses a Service Function path through the network 160. The information stored in the Segment Routing Header typically is not modified by intermediate nodes 170. Whereas, in the case of a Network Service Header, upon a determination based on the received packet, the head-end A computer can add a Network Service Header with Service Path Identifier and Service Index information, and can then forward the Network Service Header encapsulated packet to a first Service Function Forwarder in the path. The Service Function Forwarder then can perform a lookup to map the Service Path Identifier and the Service Index from the Network Service Header to the next hop and the transport encapsulation for the received packet. The Service Function Forwarder then forwards the data packet based on the stored mapping table and the same process is repeated at each subsequent node 170 in the path. The Network Service Header may be updated by an intermediate node 170.

When data packets are communicated via a satellite gateway 150, nodes 170, etc., a communication protocol may change because, at least in some examples, one or more computers in a network 160 may communicate using a protocol different from other computers in the network 160. As one example, the head-end A computer may be programmed to convert the received data packet to an internet protocol (IP) data packet and to store the list of service path identifiers in routing header data of the IP data packet. For example, the data packet received at a satellite gateway 130 from a satellite 110, a terminal 120, etc. may be based on Ethernet protocol, whereas the nodes 170 may communicate with one another using IP protocol.

Figure 4:
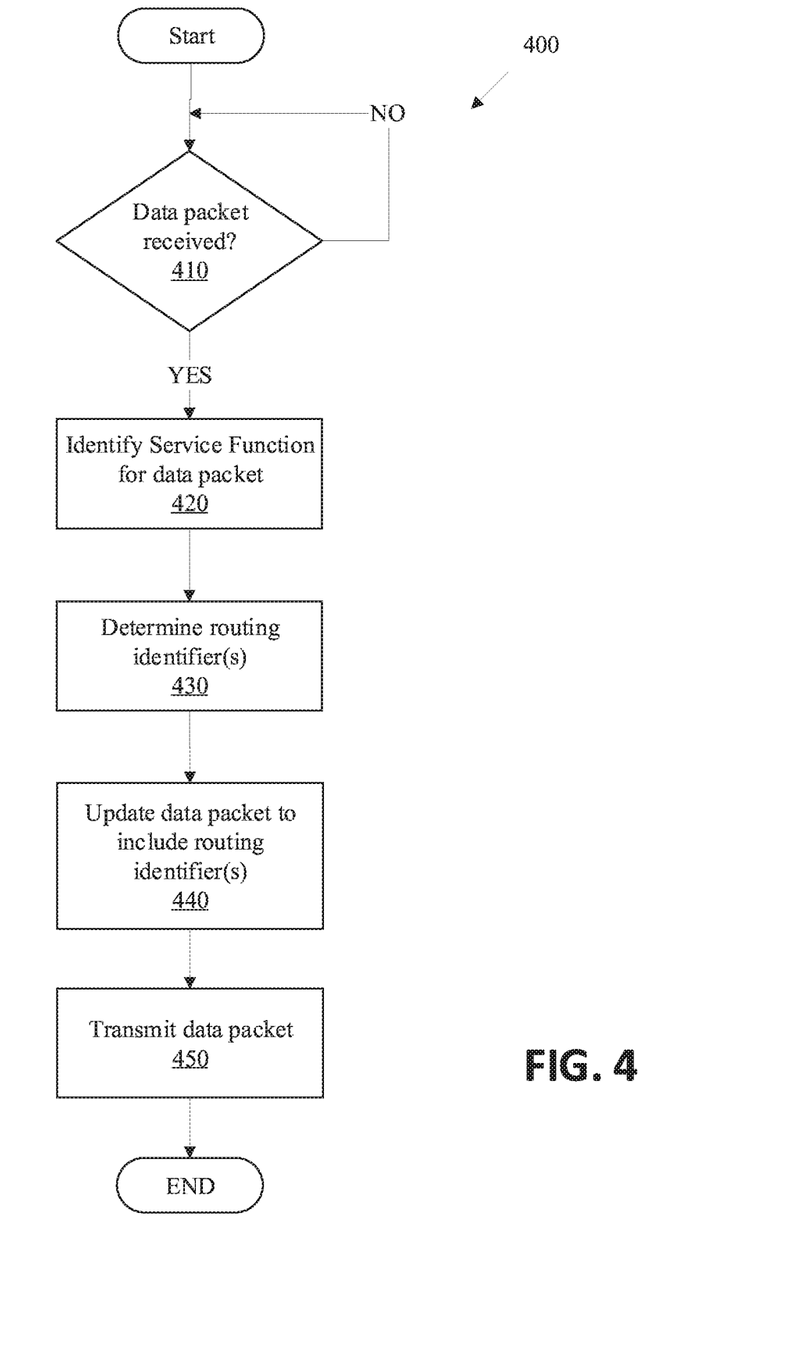
FIG. 4 is an example flowchart illustrating an example process for determining routing identifier(s) to perform Service Function Chaining (SFC).

FIG. 4 is a flowchart of an example process 400 for determining routing identifier(s) to perform Service Function Chaining (SFC). A satellite gateway 150 may be programmed to execute blocks of the process 400. Additionally or alternatively, a node 170 computer, a terminal 120 computer 130, etc. may be programmed to execute blocks of the process 400.

The process 400 begins in a decision block 410 in which the satellite gateway 150 computer 130 determines whether a data packet is received. The satellite gateway 150 computer 130 may receive a data packet from a satellite 110 via a downlink 180. If the satellite gateway 150 computer 130 determines that a data packet is received, then the process 400 proceeds to a block 420; otherwise the process 400 returns to the decision block 410.

In the block 420, the satellite gateway 150 computer 130 may determine Service Function(s) SF for the data packet based on the received data packet content, a communication protocol, etc. For example, the satellite gateway 150 computer 130 may determine TCP spoofing, Web Acceleration, or firewall Service Function SF. The satellite gateway 150 computer 130 may determine any number of Service Functions SF, i.e., including 0 (zero) upon determining that no Service Function SF execution for the respective data packet is necessary.

Next, in a block 430, the satellite gateway 150 computer 130 determines routing identifier(s) for the data packet based on the identified Service Function(s) SF and a destination of the data packet. As discussed above, as two examples, the satellite gateway 150 computer 130 may determine a Segment Identifier (SID) list or Service Path Identifier (SPI) list based on the identified Service Function(s) SF and the destination of the data packet. Upon determining that no Service Function SF operation is necessary, the satellite gateway 150 computer 130 may determine a routing identifier to route the data packet to the destination of the data packet as included in a header of the data packet.

Next, in a block 440, the satellite gateway 150 computer 130 updates the data packet based on the identified routing identifiers and/or Service Path Identifier (SPI). As discussed above, the satellite gateway 150 computer 130 may add and/or modify the data packet header to include the routing identifiers. Additionally or alternatively, the satellite gateway 150 computer 130 may encapsulate the data packet with data including routing identifier(s). For example, the data packet may be encapsulated in a new IPv6 header with the Segment Identifier SIDs in Segment Routing Header SRH. When Segment Routing is used for Service Function Chaining, then there may not be any distinction between a Routing Identifier and a Service Path Identifier. When a Network Service Header is used for Service Function Chaining, then the Routing Identifier is independent of the Service Path Identifier. In other words, a Service path can be added to the Network Service Header as Service Path Identifier SPI.

Thus, in this context, it is important to note that the data packet should be updated to include Routing Identifiers and a Service Path Identifier, whether these are or are not different from one other.

Next, in a block 450, the satellite gateway 150 computer 130 transmits the data packet based on the routing identifier(s). For example, the satellite gateway 150 computer 130 may transmit the data packet to a Service Function Forwarder SFF to apply a Service Function SF to the data packet. As discussed above, a Service Function SF may be local to the computer 130, thus, the satellite gateway 150 computer 130 may apply a local Service Function SF to the data packet, and then transmit the data packet to a next node 170, etc.

Following the block 450, the process 400 ends, or alternatively returns to the decision block 410, although not shown in FIG. 4.

Figure 5:
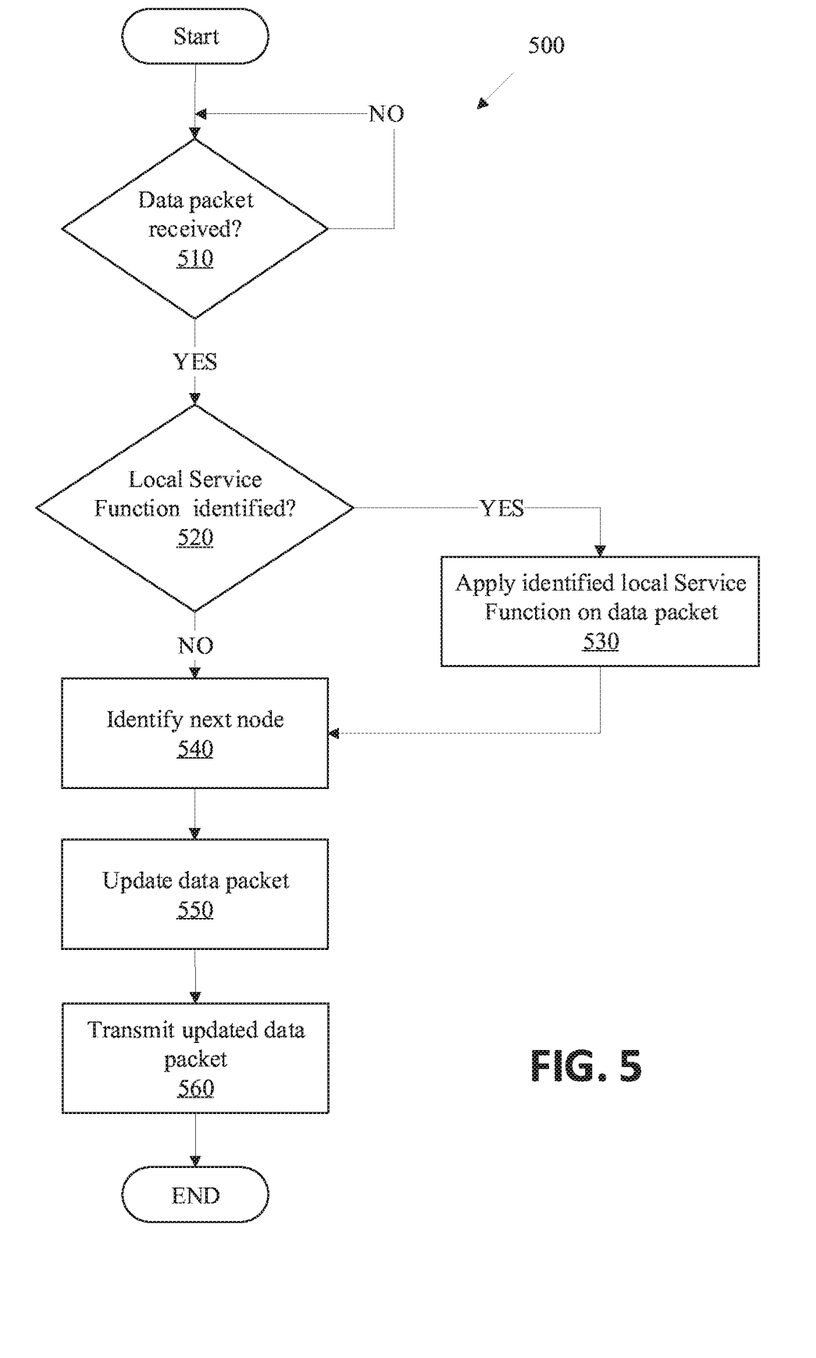
FIG. 5 is an example flowchart illustrating an example process for performing one or more Service Functions and navigating data packets in a satellite communication network.

FIG. 5 is a flowchart of an example process 500 for applying Service Function(s) SF to data packets and navigating data packets in a communication network 160. A node 170 computer may be programmed to execute blocks of the process 500.

The process 500 begins in a decision block 510, in which the node 170 computer determines whether a data packet is received. The node 170 computer may receive a data packet from another node 170 or the satellite gateway 150 computer 130. If the node 170 computer determines that a data packet is received, then the process 500 proceeds to a decision block 520; otherwise the process 500 returns to the decision block 510.

In the decision block 520, the node 170 computer determines whether a local Service Function SF is identified to apply to the data packet. For example, the node 170 computer may be programmed to identify a local Service Function SF upon determining based on the routing identifier data included in the received data packet that a Service Function SF listed in the routing identifier is available in the node 170, based on node configuration data. If the node 170 computer determines a local Service Function SF, then the process 500 proceeds to a block 530; otherwise the process 500 proceeds to a block 540.

In the block 530, the node 170 computer applies the identified local Service Function SF to the received data packet. The node 170 computer may be programmed to apply the identified local Service Function(s) SF to the data packet. The node 170 computer may initiate a Service Function SF by sending an instruction to a function interface, identified based on the node configuration data. The node 170 computer may update the data packet based on results of the Service Function SF operation. Following the block 530, the process 500 proceeds to the block 540.

In the block 540, the node 170 computer identifies a next node 170 based on the routing identifier(s), e.g., the Segment Identifier (SID) list, included in the data packet. For example, with reference to FIG. 2, the computer of the node 170 (i.e., Service Function Forwarder SFF), upon applying the Service Function SF1, i.e., completing the segment (3), may update the routing identifier of the data packet to [SFF2::SF2,B::]. Additionally or alternatively, a node 170 computer may be programmed to update the Network Service Header (NSH) included in the data packet to reflect a rest of the path of the data packet to the destination.

Next, in a block 550, the node 170 computer transmits the updated data packet. The node 170 computer may be programmed to determine a next node 170 based on the routing identifier included in the data packet.

Following the block 550, the process 500 ends, or alternatively returns to the decision block 510, although not shown in FIG. 5.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system comprising a gateway computer further comprising a processor and a memory, the memory storing instructions executable by the processor to:
   determine one or more service functions (SF) based on a received data packet, wherein each service function is identified by a service function identifier and wherein the service functions are satellite specific service functions including network layer protocol spoofing, web acceleration, header compression and suppression;
   determine a list of routing identifiers based on the determined service functions and a destination of the data packet, wherein each routing identifier identifies at least one of a router computer and a service function;
   update the data packet to include the list of routing identifiers;

transmit the updated data packet based on the list of routing identifiers;
identify a compression service function upon determining that a rate of duplicate data in the received data packet exceeds a threshold; and
update the list of routing identifiers based on the identified compression service function.

2. The system of claim 1, wherein the data packet includes a payload and header, and the list of routing identifiers is stored in a segment routing header.

3. The system of claim 1, wherein the instructions further include instructions to:
receive network nodes data, for a plurality of nodes, including available service functions at each of the nodes and a geographical location of each of the nodes; and
determine the list of segment identifiers based on the received network nodes data.

4. The system of claim 1, further comprising a network node including a second processor programmed to:
receive the updated data packet from the gateway computer; and
identify a service function of the node based on node configuration data including an interface identifier of a service function available at the network node.

5. The system of claim 4, wherein the second processor of the network node is further programmed to update the data packet for routing the data packet to a next node based on the list of segment identifiers.

6. The system of claim 1, wherein the processor of a network node is further programmed to operate a plurality of virtual machines, wherein one or more service functions are provided on each virtual machine.

7. The system of claim 1, wherein the data packet is an internet protocol (IP) data packet and the list of segment identifiers is stored in routing header data of the IP data packet.

8. The system of claim 1, wherein the data packet includes a payload and a network service header, and the list of routing identifiers is stored in the network service header.

9. The system of claim 1, wherein the instructions further include instructions to:
receive network nodes data, for a plurality of nodes, including available service functions at each of the nodes; and
determine a list of service path identifiers based on the received network nodes data.

10. The system of claim 9, wherein the second processor of the network node is further programmed to update the data packet for routing the data packet to a next node based on the list of service path identifiers.

11. The system of claim 1, wherein the instructions further include instruction to convert the received data packet to an internet protocol (IP) data packet and to store the list of service path identifiers in routing header data of the IP data packet.

12. A method, comprising:
determining one or more service functions (SF) based on a received data packet, wherein each service function is identified by a service function identifier and wherein the service functions are satellite specific service functions including network layer protocol spoofing, web acceleration, header compression and suppression;
determining a list of routing identifiers based on the determined service functions and a destination of the data packet, wherein each routing identifier identifies at least one of a router computer and a service function;
updating the data packet to include the list of routing identifiers;
transmitting the updated data packet based on the list of routing identifiers;
identifying a compression service function upon determining that a rate of duplicate data in the received data packet exceeds a threshold; and
updating the list of routing identifiers based on the identified compression service function.

13. The method of claim 12, further comprising:
receiving network nodes data, for a plurality of nodes, including available service functions at each of the nodes and a geographical location of each of the nodes; and
determining a list of segment identifiers based on the received network nodes data.

14. The method of claim 12, further comprising:
receiving, in a network node, the updated data packet from the gateway computer; and
identifying, in the network node, a service function of the node based on node configuration data including an interface identifier of a service function available at the network node.

15. The method of claim 14, further comprising updating, in the network node, the data packet for routing the data packet to a next node based on the list of segment identifiers.

16. The method of claim 12, wherein the data packet includes a payload and a network service header, and the list of routing identifiers is stored in the network service header.

17. The method of claim 12, further comprising:
receiving network nodes data, for a plurality of nodes, including available service functions at each of the nodes; and
determining a list of service path identifiers based on the received network nodes data.

* * * * *